(12) United States Patent
Abbate et al.

(10) Patent No.: US 8,928,623 B2
(45) Date of Patent: Jan. 6, 2015

(54) AUXILIARY USER INPUT DEVICE

(75) Inventors: Giuseppe Abbate, Rochester, NY (US);
Brian M. Dominiak, Fairport, NY (US);
Mark Benoit, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 141 days.

(21) Appl. No.: 13/538,179

(22) Filed: Jun. 29, 2012

(65) Prior Publication Data
US 2014/0002408 A1   Jan. 2, 2014

(51) Int. Cl.
*G06F 3/045* (2006.01)
*G06F 3/041* (2006.01)

(52) U.S. Cl.
CPC ................... *G06F 3/0412* (2013.01)
USPC ....................................................... 345/174

(58) Field of Classification Search
USPC .................... 345/156–179; 178/18.05, 18.06; 361/679.1–679.56
See application file for complete search history.

(56) References Cited

U.S. PATENT DOCUMENTS

| | | | |
|---|---|---|---|
| 2008/0231605 A1* | 9/2008 | Yang | 345/173 |
| 2009/0009945 A1* | 1/2009 | Johnson et al. | 361/681 |
| 2009/0140987 A1 | 6/2009 | Yang | |
| 2009/0152023 A1 | 6/2009 | Yeh et al. | |
| 2009/0186264 A1* | 7/2009 | Huang | 429/96 |
| 2010/0078231 A1 | 4/2010 | Yeh et al. | |
| 2011/0050619 A1 | 3/2011 | Griffin | |
| 2012/0062519 A1* | 3/2012 | Holtzman et al. | 345/177 |
| 2013/0019207 A1* | 1/2013 | Rothkopf et al. | 715/835 |

* cited by examiner

*Primary Examiner* — Kent Chang
*Assistant Examiner* — Mark Edwards
(74) *Attorney, Agent, or Firm* — Fox Rothschild LLP; Robert J. Sacco, Esq.

(57) ABSTRACT

Systems and methods for providing an auxiliary user input device (101, 501, 601) for use with a mobile electronic device (181, 681). The methods involve: releasably securing (703) a first device (101, 601) comprising a resistive touch screen (103, 603) to a second device (181, 681) comprising a capacitive touch screen (183, 683), in a position wherein a primary plane of the capacitive touch screen is substantially aligned in parallel and subjacent to a primary plane of the resistive touch screen; establishing (705) a communication link (641, 643) between a first communications interface (617, 619) in the first device and a second communications interface (657, 659) in the second device; generating resistive touch screen output data in response to user input received (707) at the resistive touch screen; and communicating (713) the resistive touch screen output data from the first device to the second device via the communication link.

18 Claims, 5 Drawing Sheets

FIG. 7 ical contact. As such,
AUXILIARY USER INPUT DEVICE

STATEMENT OF THE TECHNICAL FIELD

The invention concerns mobile electronic devices. More particularly, the invention concerns systems and methods for expanding the range of environments and applications in which a mobile electronic device having a touch screen can be effectively utilized.

DESCRIPTION OF THE RELATED ART

Electronic touch screens are often used to display information and receive user input in various types of electronic devices, including mobile phones (e.g., "smartphones"), mobile radios, laptop computers, and tablet computers. Various types of electronic touch screens exist, including capacitive touch screens and resistive touch screens.

Capacitive touch screens are often used in consumer electronics devices (e.g., cellular telephones) because they offer relatively high display brightness and fast response to user input. Capacitive touch screens generally operate to receive user input based on the principle of charge transfer from the screen to a conductive object such as a user's finger or a special stylus. Thus, a user wearing gloves may find it difficult to operate a capacitive touch screen. Capacitive touch screen sensitivity can be degraded by environmental conditions, such as high humidity.

Resistive touch screens are often used in military electronic devices because they can be relatively more rugged, resistant to damage, and less susceptible to interference from environmental conditions such as humidity. Resistive touch screens generally operate to receive user input based on the principle of mechanical displacement that causes two layers in the resistive touch screen to create an electrical contact. As such, resistive touch screens can be operated by anything capable of exerting a force on the screen, including a non-conductive object such as a user's gloved finger. Resistive touch screens generally respond more slowly and require more force to operate relative to capacitive touch screens.

SUMMARY OF THE INVENTION

Embodiments of the present invention concern methods for providing an auxiliary user input device for use with a mobile electronic device having a capacitive touch screen. The methods generally involve: releasably securing a first device comprising a resistive touch screen to a second device comprising a capacitive touch screen. The devices are secured in a position wherein a primary plane of the capacitive touch screen is substantially aligned in parallel and subjacent to a primary plane of the resistive touch screen. The methods further involve establishing a communication link between a first communications interface in the first device and a second communications interface in the second device. The methods further involve generating, in the first device, resistive touch screen output data in response to user input received at the resistive touch screen. The resistive touch screen output data is then communicated from the first device to the second device via the communication link.

Embodiments of the present invention also concern an auxiliary user input device. The auxiliary user input device includes a resistive touch screen configured to generate resistive touch screen output data in response to user input received at the resistive touch screen. The auxiliary user input device further includes a securing element configured to releasably secure the auxiliary input device to a mobile electronic device in a position which orients a primary plane of a capacitive touch screen associated with the mobile electronic device substantially parallel and subjacent to a primary plane of the resistive touch screen. The auxiliary user input device further includes a first communication interface configured for communicating the resistive touch screen output data from the auxiliary user input device to a second communication interface associated with the mobile electronic device.

Embodiments of the present invention also concern systems implementing the above described method embodiments. The system embodiments generally comprise a mobile electronic device and an auxiliary user input device. A resistive touch screen in the auxiliary user input device is configured to generate resistive touch screen output data in response to user input received at the resistive touch screen. A first communications interface in the auxiliary user input device is configured to receive the resistive touch screen output data. A second communications interface in the mobile electronic device is configured to receive the resistive touch screen output data via the first communications interface. A capacitive touch screen is disposed in the mobile electronic device. A securing element is configured to releasably secure the auxiliary user input device to the mobile electronic device in a position which orients a primary plane of the capacitive touch screen substantially parallel and subjacent to a primary plane of the resistive touch screen.

BRIEF DESCRIPTION OF THE DRAWINGS

Exemplary embodiments will be described with reference to the following drawing figures, in which like numerals represent like items throughout the figures, and in which.

DETAILED DESCRIPTION

The present invention is described with reference to the attached figures. The figures are not drawn to scale and they are provided merely to illustrate exemplary embodiments of the present invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Commercial Off-The-Shelf ("COTS") electronic devices are generally inexpensive relative to custom-built devices, but may not be suitable for use in certain applications or environments. For example, a COTS mobile electronic device having a capacitive touch screen can be difficult to operate when a user is wearing gloves, or in high humidity environments, as discussed above. The present invention concerns facilitating the use of COTS devices comprising capacitive touch screens in applications and environments in which such use would otherwise be impractical. Exemplary embodiments of the present invention include an auxiliary user input device comprising a resistive touch screen configured for use with a mobile electronic device having a capacitive touch screen. The auxiliary user input device can be comprised of a rugged case or sleeve that positions and secures the resistive touch screen adjacent to the capacitive touch screen. More particularly, the case positions or secures the resistive touch screen so that a primary plane of the capacitive touch screen is substantially aligned in parallel and subjacent to a primary plane of the resistive touch screen. The mobile electronic device can be a COTS electronic device comprising a capacitive touch screen, such as a consumer smartphone, for example. When user input is received at the resistive touch screen in the auxiliary user input device, resistive touch screen output data is generated and communicated to the mobile electronic device via a wired or wireless communication link. The same user input can also be received at the capacitive touch screen in the mobile electronic device. The mobile electronic device selectively determine user input based on the resistive touch screen output data, capacitive touch screen output data, or both. Thus, exemplary embodiments of the present invention provide a cost-effective solution for increasing the range of applications and environments in which a COTS device comprising a capacitive touch screen can be effectively utilized.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Rugged Case Embodiment for Use with COTS Smartphone

FIGS. 1-4 depict an exemplary, non-limiting embodiment as described in detail below. Case 101 is an exemplary embodiment of an auxiliary user input device comprising a resistive touch screen 103, and is configured to be used in conjunction with smartphone 181. Smartphone 181 is an exemplary embodiment of a mobile electronic device comprising a capacitive touch screen 183. When used in conjunction with case 101, smartphone 181 can be operated by resistive touch screen 103, and, optionally, by capacitive touch screen 183, as described in detail below. Other features and advantages of the invention will become apparent as the discussion progresses.

Figure 1:
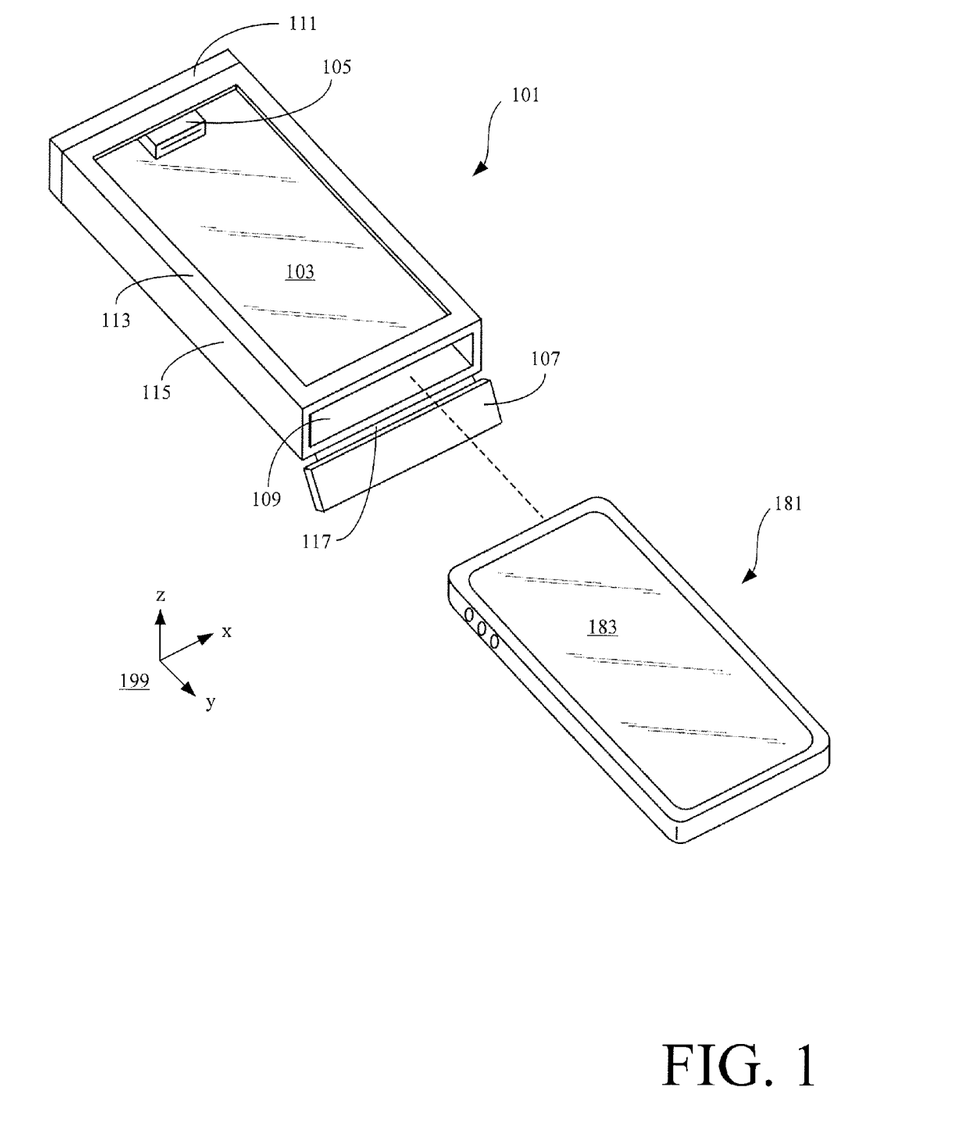
FIG. 1 is a top perspective view of an exemplary auxiliary user input device and exemplary mobile electronic device that is useful for understanding the present invention.

Referring now to FIG. 1, there is provided a top perspective view of case 101 and smartphone 181. Case 101 can be a rugged case designed for military, industrial, and/or emergency responder applications, as non-limiting examples. Case 101 can be designed specifically for use with a particular model of mobile electronic device, such as smartphone 181. Alternatively, case 101 can be designed to be compatible with many different makes and models of mobile electronic devices having different properties, dimensions, and manufacturers. Resistive touch screen 103 can be any type of resistive touch screen now known or later developed. Resistive touch screen 103 has a substantially planar surface disposed primarily in the "x-y" plane indicated by legend 199.

Smartphone 181 can be a commercial off-the-shelf ("COTS") consumer smartphone designed for civilian applications. Smartphone 181 comprises capacitive touch screen 183 configured to receive user input and generate capacitive touch screen output data. Capacitive touch screen 183 has a substantially planar surface that is disposed primarily in the "x-y" plane indicated by legend 199 when smartphone 181 is secured by case 101.

Capacitive touch screens are generally unable to receive good quality user input from a non-conductive object, such as a user's gloved finger. Capacitive touch screens can also fail or produce noisy output in certain environments, such as in high humidity. Case 101 is configured to allow smartphone 181 to be operated by resistive touch screen 103, thereby allowing operation by a user wearing gloves and/or facilitate use in a high humidity environment. Case 101 can be water-tight and/or air-tight, to prevent moisture from entering into an interior of the case.

Case 101 comprises resistive touch screen 103, dock connector 105, lid 107, opening 109, compartment 111, bevel 113, walls 115, and hinge 117. Case 101 is configured to secure smartphone 181 to the resistive touch screen such that a primary plane of capacitive touch screen 183 is aligned in parallel and subjacent to a primary plane of resistive touch screen 103. Dock connector 105 is configured to mate with a female dock connector 185, shown in FIG. 4, in smartphone 181, and to carry electronic signals, including resistive touch screen output data, between case 101 and smartphone 181, as discussed in detail below. Case 101 can be dimensioned such that a female dock connector 185 in smartphone 181 will be guided onto dock connector 105 when smartphone 181 is inserted into case 101. Dock connector 105 can also be configured to carry electrical power as discussed in detail below. Lid 107 is connected to hinge 117, which allows lid 107 to open and close. When lid 107 is in the closed position it covers opening 109, and can thereby secure smartphone 181 within case 101. Case 101 can be designed to be water-tight when lid 107 is in the closed position. Opening 109 is dimensioned to receive smartphone 181. Compartment 111 is provided to enclose electronics, including an optional battery, as discussed in detail below. Compartment 111 can be water-tight and/or air-tight, and can include an access panel (not shown) or other mechanism for providing access to the interior of compartment 111 (e.g., to replace a battery). Beveled edge 113 extends above resistive touch screen 103, thereby providing impact protection. Walls 115 can be formed or molded of a rugged plastic or other polymer material, resin, or lightweight metal alloy. The case dimensions are preferably chosen so that the case conforms to the exterior of the mobile electronic device.

Resistive touch screen 103 is configured to receive user input and generate resistive touch screen output data. As discussed above, resistive touch screen 103 can receive good quality user input even from a gloved finger. Resistive touch screen 103 can be flexible or non-flexible. For example, resistive touch screen 103 can have a non-flexible backing layer. Resistive touch screen 103 is substantially transparent, such that a display from capacitive touch screen 183 is visible through resistive touch screen 103. For example, resistive touch screen 103 can be a transparent input-only touch screen. Alternatively, resistive touch screen 103 can include display functionality and smartphone 181 can be configured to communicate auxiliary display information to resistive touch screen 103 via a communication link (e.g., via dock connector 105). The auxiliary display information can be the same or different as compared to information displayed on the capacitive touch screen provided by the mobile electronic device.

Figure 2:
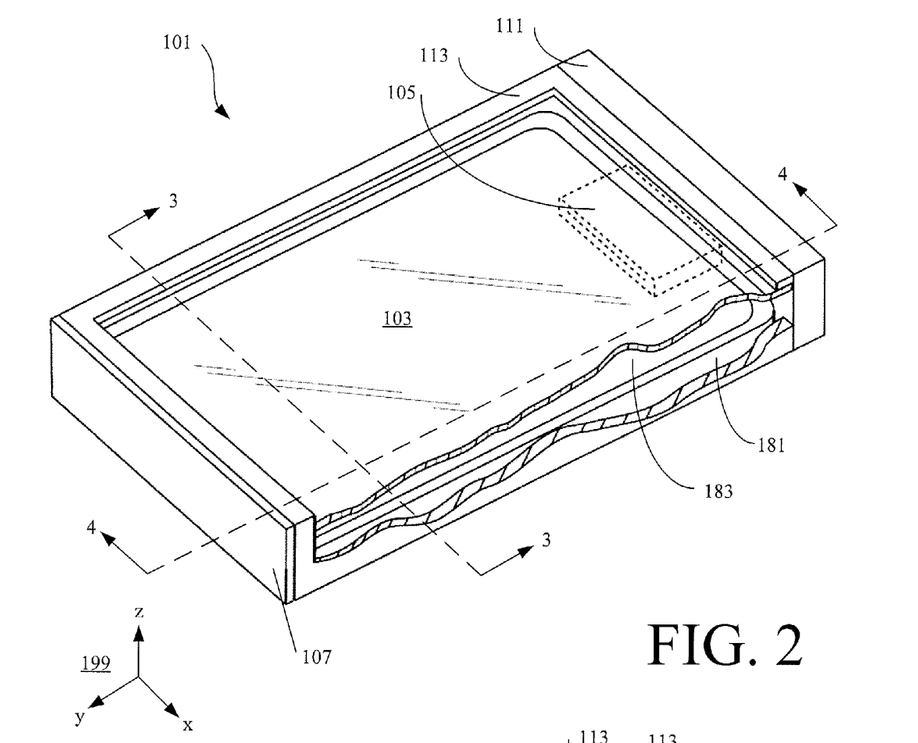
FIG. 2 is a top perspective view of the auxiliary user input device of FIG. 1, shown in partial cutaway with the mobile electronic device of FIG. 1 inserted therein.

Referring now to FIG. 2, there is provided a top perspective view of case 101, shown with smartphone 181 disposed therein. Lid 107 is shown in the closed position. A cutaway is shown in wall 115 and resistive touch screen 103 to show smartphone 181 disposed inside case 101. A primary plane of capacitive touch screen 183 is aligned substantially in parallel and subjacent to a primary plane of resistive touch screen 103. Thus, a user input received at resistive touch screen 103 can also be received by capacitive touch screen 183, (e.g., depending on the tuning of capacitive touch screen 183 as discussed in detail below). As mentioned above, a display provided by capacitive touch screen 183 can be visible through a transparent resistive touch screen 103.

Figure 3:
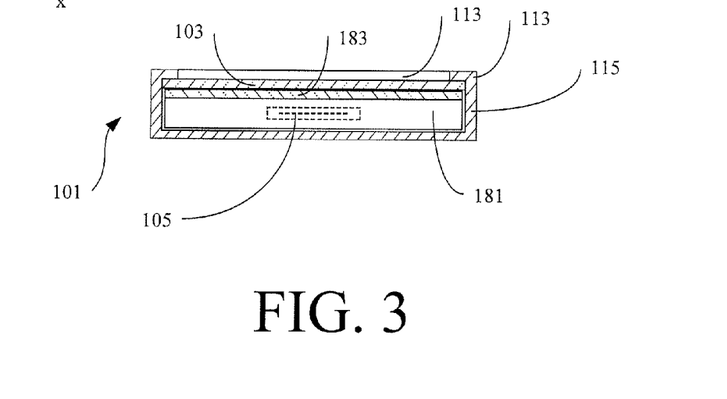
FIG. 3 is a cross-section view of the auxiliary user input device and mobile electronic device of FIG. 1, taken along line 3-3 of FIG. 2.

Referring now to FIG. 3, there is provided a cross-section view of exemplary case 101 with smartphone 181 disposed therein, taken along line 3-3 of FIG. 2. As can be seen, capacitive touch screen 183 is immediately subjacent to resistive touch screen 103. However, the two touch screens need not be in physical contact and case 101 can be configured such that there is a gap between capacitive touch screen 183 and resistive touch screen 103.

Figure 4:
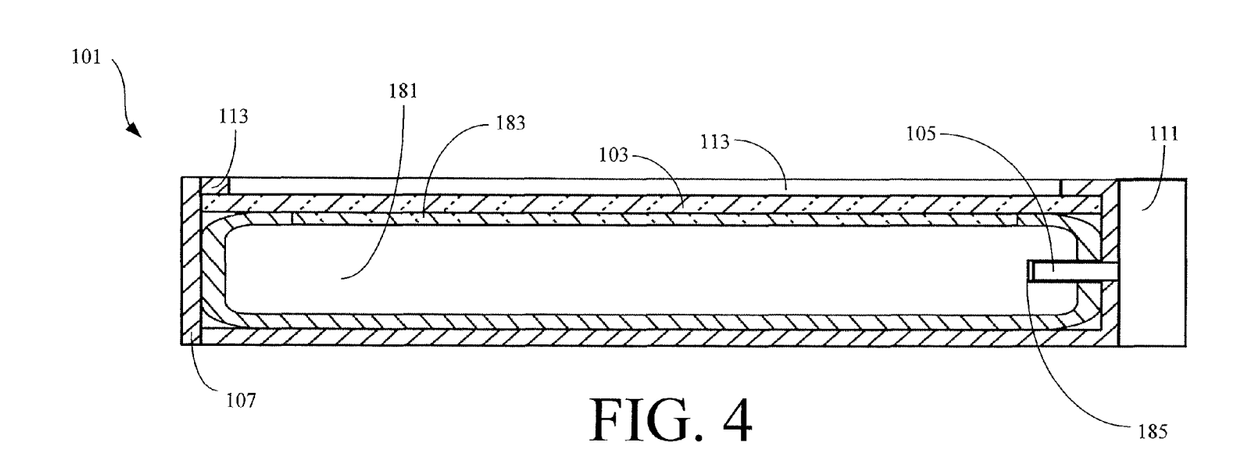
FIG. 4 is a cross-section view of the auxiliary user input device and mobile electronic device of FIG. 1, taken along line 4-4 of FIG. 2.

Referring now to FIG. 4, there is provided a cross-section view of exemplary case 101, shown with smartphone 181 disposed therein, taken along line 4-4 of FIG. 2. As can be seen, dock connector 105 is mated with female dock connector 185 in smartphone 181, thereby providing wired communication between case 101 and smartphone 181.

Figure 6:
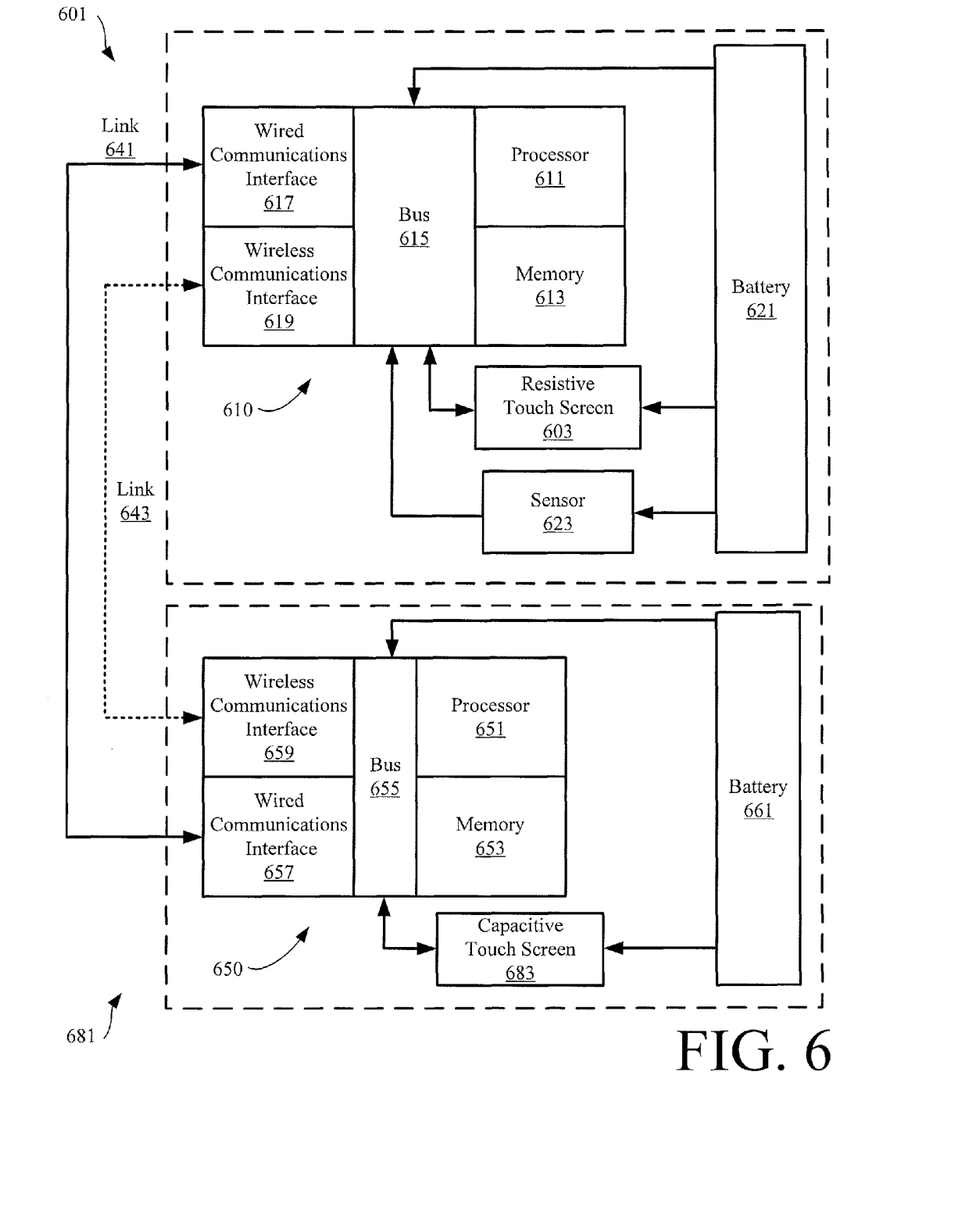
FIG. 6 is a block diagram of electronic components in an exemplary system that is useful for understanding the present invention.

Referring now to FIG. 6, there is provided a block diagram of exemplary electronic components for an exemplary auxiliary user input device 601, such as case 101, and an exemplary mobile electronic device 681, such as smartphone 181. Auxiliary user input device 601 comprises resistive touch screen 603, circuitry 610, battery 621 and sensor 623. Circuitry 610, battery 621 and sensor 623 can be disposed in a separate compartment within auxiliary user input device 601, such as compartment 111 in case 101. Mobile electronic device 681 comprises capacitive touch screen 683, circuitry 650, and battery 661.

Battery 621 provides power to one or more components including circuitry 610, resistive touch screen 603, and sensor 623. Auxiliary user input device 601 can be configured to provide power from battery 621 to mobile electronic device 681, e.g., via wired communications interface 617. Thus, battery 621 can act as an auxiliary battery that charges battery 661 in mobile electronic device 681. However, it should be noted that battery 621 is optional. Resistive touch screen 103 and wired communications interface 619 can draw power from the mobile electronic device (e.g., battery 661 in smartphone 181) thus eliminating the need for battery 621 in the auxiliary user input device.

Sensor 623 measures environmental and/or operational conditions and generates sensor output data, which is provided to processor 611 via bus 615. For example, sensor 623 can be a humidity sensor, a battery life sensor, and/or a mechanical switch sensor, as non-limiting examples.

Circuitry 610 in auxiliary user input device 601 includes processor 611, memory 613, and bus 615. Circuitry 610 also includes wired communications interface 617 and/or wireless communications interface 619. Processor 611 can be any known microprocessor, such as a Programmable Interrupt Controller (PIC). Processor 611 can be configured to establish a communication link (e.g., 641, 643) to mobile electronic device 681 via wired communications interface 617 and/or wireless communications interface 619. Processor 611 is configured to receive data such as resistive touch screen output data from resistive touch screen 603 and sensor data from sensor 623. Processor 611 is configured to process received data, for example by formatting the data for transmission to mobile electronic device 681. Memory 613 provides data storage accessible to processor 611, and can be a volatile or non-volatile memory, such as flash memory or Random Access Memory (RAM).

Wired communications interface 617 is configured to support wired communication link 641 to wired communications interface 657 in mobile electronic device 681, e.g., via dock connector 105. For example, wired communications interface 617 can include a Universal Serial Bus ("USB") controller that supports the USB On-The-Go ("USB OTG") specification. Wired communications interface 617 can be implemented as hardware and/or software, such as software executed by processor 611.

Wireless communications interface 619 is configured to support wireless communication link 643 to wireless communications interface 659 in mobile electronic device 681. For example, wireless communications interface 619 can include a Bluetooth controller, a Near-Field Communication controller, or any other short-range wireless technology now known or later developed. Wireless communications interface 619 can be implemented as hardware and/or software, such as software executed by processor 611.

Circuitry 650 in mobile electronic device 681 comprises processor 651, memory 653, and bus 655. Circuitry 650 also includes wired communications interface 657 and/or wireless communications interface 659. Battery 661 provides power to circuitry 650 and capacitive touch screen 183. Battery 661 can also be configured to provide battery life data to circuitry 650, e.g., via bus 655. Processor 651 communicates with memory 653, wired and wireless communications interfaces 657 and 659, and capacitive touch screen 683 via bus 655.

The system can be configured to operate in a plurality of available user input modes. Processor 651 is advantageously configured to select one of a plurality of available user input modes. Available user input modes can include a resistive input mode, a capacitive input mode, and a blended input mode. The available user input modes will be described in greater detail below with reference to FIG. 7.

Processor 651 can be configured to execute a capacitive touch screen device driver. A capacitive touch screen device driver can be configured to receive and process capacitive touch screen output data in order to determine characteristics of the user input, such as location, velocity, force, and duration, as non-limiting examples. The capacitive touch screen device driver can be "tuned" for different applications or operating conditions, such as by adjusting a sensitivity level.

Processor 651 is also configured to receive data from auxiliary user input device 601, including resistive touch screen data and sensor data, as non-limiting examples. For example, processor 651 can be configured to execute customized software for use with auxiliary user input device 601, as discussed in detail below. Custom application software for use with auxiliary user input device 601 can be stored in memory 653 for execution by processor 651. For example, processor 651 can be configured to adjust the tuning of a capacitive touch screen driver when mobile electronic device 681 is connected to auxiliary user input device 601, as discussed in detail below.

Processor 651 is configured to execute a resistive touch screen device driver when mobile electronic device 681 is connected to auxiliary user input device 601. A resistive touch screen device driver is configured to receive and process resistive touch screen output data in order to determine characteristics of the user input, such as location, velocity, force, and duration, as non-limiting examples.

The system can be configured to operate in a plurality of available display modes. Available display modes can include, without limitation, a first display mode, wherein a display functionality of capacitive touch screen 683 is activated, and second display mode, wherein a display functionality of capacitive touch screen 683 is disabled, and a display functionality of resistive touch screen 603 is activated. For example, processor 651 can be configured to select the first display mode when mobile electronic device 681 is not connected to auxiliary user input device 601, and to select the second display mode when mobile electronic device 681 is connected to auxiliary user input device 601. In the second display mode, processor 651 communicates display information comprising text and/or graphics data to auxiliary user input device 601 via a communication link (e.g., 641, 643). Display functionality can be provided by a capacitive touch screen display driver and/or a resistive touch screen display driver, which can be selectively executed by processor 651, e.g., depending on display mode.

Exemplary Method of Use and Data Processing Embodiments

Data processing can be performed in the auxiliary user input device and mobile electronic device as discussed in detail below. As discussed above, the mobile electronic device can be a COTS device configured with customized software according to embodiments of the present invention. Furthermore, the mobile electronic device can be configured to operate in one of a plurality of input modes as discussed in detail below.

Figure 7:
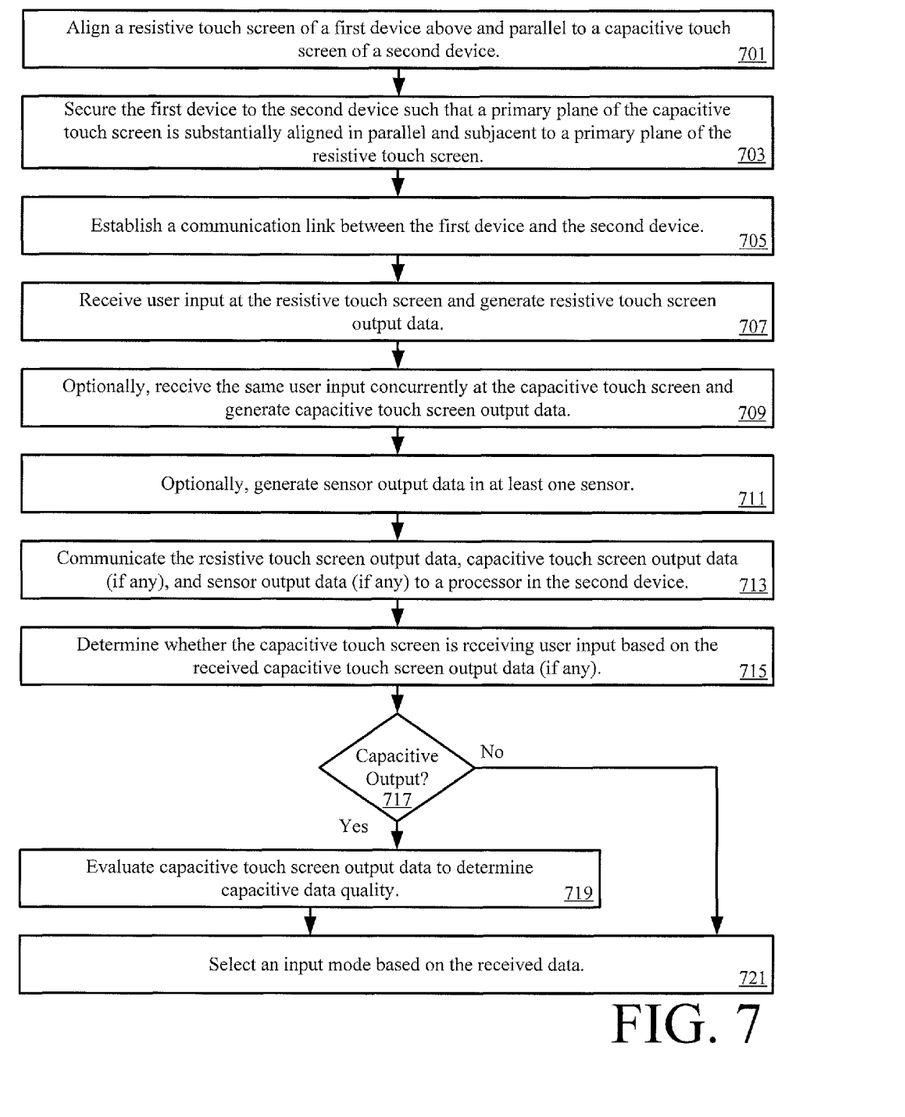
FIG. 7 is a process flow diagram of an exemplary method that is useful for understanding the present invention.

Referring now to FIG. 7, there is provided a process flow diagram of an exemplary method for using a system comprising an auxiliary user input device and a mobile electronic device, as well as data processing operations performed in the two devices. While FIG. 7 is described below with reference to the exemplary embodiments of FIGS. 1-6, it should be understood that these references are exemplary and non-limiting.

At step 701, a resistive touch screen of an auxiliary user input device is aligned above and parallel to a capacitive touch screen of a mobile electronic device. For example, step 701 can include inserting smartphone 181 into case 101 as discussed above.

At step 703, the auxiliary user input device is secured to the mobile electronic device such that a primary plane of the capacitive touch screen is substantially aligned in parallel and subjacent to a primary plane of the resistive touch screen. For example, the face of resistive touch screen 103 can be disposed immediately above and parallel to capacitive touch screen 183. For example, step 703 can include releasably securing lid 107 in the closed position, thereby releasably securing smartphone 181 in place within case 101. Alternatively, step 703 can include securing resistive touch screen 103 to capacitive touch screen 183 using an adhesive as discussed below. Alternatively, step 703 can include securing multiple pieces (e.g., a top piece and a bottom piece) of case 101 such that smartphone 181 is secured therein.

At step 705, a communication link is established between the auxiliary user input device and mobile electronic device. The communication link may be initiated by either device. For example, smartphone 181 can be configured to initiate negotiation of a communication link when a connection is detected. When a connection is detected, the mobile electronic device can be configured to perform a pre-defined action, such as execute pre-defined software programs, e.g., in processor 651. For example, smartphone 181 can be configured to detect a connection to case 101 (e.g., via dock connector 105). As discussed above, a capacitive touch screen device driver executed in the mobile electronic device (e.g., by processor 651) can be tunable to accommodate different operating conditions. For example, smartphone 181 can be configured increase a sensitivity level of a capacitive touch screen device driver in response to a detected communication link to case 101, e.g., to account for the presence of resistive touch screen 103 disposed between the user and capacitive touch screen 183. Further at step 705, the mobile electronic device can optionally switch to a different display mode when the connection to the auxiliary user input device is detected. For example, smartphone 181 can be configured to disable display functionality of capacitive touch screen 183 when a display of resistive touch screen 103 is active, e.g., to conserve battery life.

At step 707, user input is applied to a resistive touch screen in the auxiliary user input device. For example, a user input can be applied to resistive touch screen 103, which generates resistive touch screen output data. Resistive touch screen output data can be pre-processed by processor 611, e.g., formatted for transmission to smartphone 181.

At step 709, the same user input may be received concurrently at a capacitive touch screen in the mobile electronic device. For example, capacitive touch screen 183 can receive the same user input received at resistive touch screen 103 in step 707. If user input is received, capacitive touch screen 183 generates capacitive touch screen output data which is provided to processor 651 via bus 655. For example, if a user wearing gloves uses a gloved finger to apply input to resistive touch screen 103, the user input may not be received by capacitive touch screen 183. Alternatively, the user input may be received by capacitive touch screen 183, but in a noisy condition, in which case capacitive touch screen output data may be considered low quality. Alternatively, the user input may be received at capacitive touch screen 183 with a relatively high quality level, e.g., if the user is not wearing gloves.

At optional step 711, a sensor in the auxiliary user input device generates sensor output data (e.g., sensor 623 generates sensor output data). As discussed above, sensor 623 can be a humidity sensor, a battery life sensor, and/or a mechanical switch sensor, as non-limiting examples. Sensor output data can comprise humidity sensor data, battery life sensor data, and/or mechanical switch sensor data.

At step 713, data is communicated to a processor in the mobile electronic device (e.g., processor 651). Data generated in the auxiliary user input device is communicated to the mobile electronic device via the communication link established at step 705. For example, resistive touch screen output data is communicated to processor 651 via the communication link. Resistive touch screen output data can be communicated to a resistive touch screen device driver executed by processor 651. If sensor output data was generated, it can also be communicated to processor 651. Data generated within the mobile electronic device, such as capacitive touch screen output data, can also be communicated to the processor in the mobile electronic device.

At step 715, a processor in the mobile electronic device determines whether a capacitive touch screen is receiving user input. For example, if capacitive touch screen output data was generated at step 709, it is communicated to processor 651 via bus 655. Capacitive touch screen output data can be communicated to a capacitive touch screen device driver executed by processor 651.

At step 717, the processor in the mobile electronic device determines whether any capacitive touch screen output data was generated at step 709. If not, then flow proceeds to step 721. If capacitive touch screen output data was generated at step 709, then flow proceeds to step 719.

At step 719, the system evaluates capacitive touch screen output data generated at step 705. For example, processor 651 can analyze received capacitive touch screen output data to determine a data quality thereof. Optionally, processor 651 also evaluates a quality of resistive touch screen output data. Processor 651 can be configured to determine data quality using heuristics and/or adaptive filtering techniques. For example, processor 651 can apply heuristics to detect erroneous data values, and measure capacitive data quality based on detected error rate.

At step 721, an input mode is selected based on the data received at the processor in the mobile electronic device. For example, processor 651 can be configured to select one of a resistive input mode, a capacitive input mode, and a blended input mode as described above. In resistive input mode, processor 651 determines user input based only on resistive touch screen output data. In capacitive input mode, processor 651 determines user input based only on capacitive touch screen output data. In blended input mode, processor 651 determines user input based on resistive touch screen output data and capacitive touch screen output data. For example, in blended input mode, user input can be determined by computing a weighted average of the resistive and capacitive output data. The relative weights can be selected based on the evaluated data quality, for example. Averaging can be performed to compute the location, duration, or other characteristics of the received user input.

Selection of a user input mode can be performed in a variety of ways. For example, processor 651 can be configured to select a user input mode based on a weighted function of selection criteria. Selection criteria can include capacitive data quality, resistive data quality, sensor data (e.g., humidity level, battery life remaining for battery 621, mechanical switch position), and battery life remaining for battery 661, as non-limiting examples.

When user input is received from capacitive touch screen 183 with acceptable quality, it can be desirable to use capacitive input mode, e.g., because of better response time than resistive touch screen 103. Similarly, when resistive touch screen output data is of low quality, e.g., when the user input is too light, it can be desirable to use capacitive input mode. When capacitive touch screen output data is of low quality it can be desirable to use resistive input mode or blended input mode. When capacitive touch screen output data and resistive touch screen output data both have similar quality (i.e., both have good quality or both have poor quality), it can be desirable to use a blended input mode.

In one embodiment, a mechanical selector switch is provided in the auxiliary user input device (e.g., case 101). The selector switch position can be used to directly determine user input mode for processor 651 (i.e., can over-ride other criteria). The selector switch can have multiple positions corresponding to different functionality. For example, the switch can have four (4) positions corresponding to resistive mode, capacitive mode, blended mode, and "auto" mode. When the selector switch is in the "auto" mode position, case 101 can be configured to instruct processor 651 to select an input mode based on other criteria (i.e., ignore the selector switch position).

As noted above, capacitive touch screens tend to fail or produce noisy or erroneous output data in a humid environment. Sensor output data can include humidity sensor data, and processor 651 can be configured to select the resistive input mode if measured humidity is above a pre-determined threshold. Alternatively, processor 651 can be configured to select the blended input mode if measured humidity is above a pre-determined threshold.

Sensor output data can also include battery life data for battery 621. Processor 651 can be configured to select capacitive input mode if the remaining life for battery 621 is below a pre-determined threshold, i.e., to prolong operation.

Processor 651 can also receive battery life data for battery 661 in smartphone 181. Processor 651 can be configured to select resistive input mode if the remaining life for battery 661 is below a pre-determined threshold, i.e., to prolong operation.

Steps 707-721 of FIG. 7 can be executed repeatedly in a continuous loop, e.g., with a pre-determined polling frequency. Alternatively, steps 707-721 can be invoked using an Interrupt Service Routine ("ISR") running in the first device and/or the second device. For example, user input received at either touch screen can trigger an ISR.

Additional Exemplary Embodiments

Case 101 depicted in FIGS. 1-4 is one exemplary embodiment of an auxiliary user input device comprising a resistive touch screen, and smartphone 181 is one exemplary embodiment of a mobile electronic device comprising a capacitive touch screen. While various aspects of the invention have been described with reference to case 101 and smartphone 181, many other embodiments are possible and within the scope of the invention. Exemplary embodiments of the mobile electronic device include mobile radios, Personal Digital Assistants (PDAs), laptop computers, and tablet computers as non-limiting examples. In one embodiment, the mobile electronic device can be a tablet computer, and case 101 can be dimensioned accordingly. A case or sleeve designed for a tablet computer can be substantially similar to exemplary case 101 of FIGS. 1-4, but having larger dimensions.

An auxiliary user input device can include additional or different features and/or components from case 101. For example, case 101 can include an antenna configured to transmit and receive signals to and from remote communications equipment, such as a wireless base station. Signals can be communicated between smartphone 181 and an antenna in case 101 via the communication link (e.g., 641, 643) as discussed above. In one embodiment, resistive touch screen 103 can be replaced by another type of touch screen, such as an acoustic wave touch screen or infra-red (IR) touch screen.

In one embodiment, case 101 is configured to allow voice communication via smartphone 181 disposed within case 101. For example, case 101 can include a baffled opening to allow sound to escape from a speaker (not shown) in smartphone 181. Case 101 can also include a baffled opening (e.g., voice port) configured to allow sound to be received at a microphone (not shown) of smartphone 181, for allowing a user's speech to be received at the microphone. Alternatively, case 101 can include an auxiliary speaker and/or auxiliary microphone. Signals can be communicated between smartphone 181 and the auxiliary speaker and microphone in case 101 via the communication link (e.g., 641, 643) as discussed above. Thus, voice communication can be provided via smartphone 181 even when it is secured within (air-tight and/or water-tight) case 101.

An auxiliary user input device can also include fewer components than case 101. For example, an auxiliary user input device need not include battery 621, or sensor 623. An auxiliary user input device need not contain both wired communications interface 617 and wireless communications interface 619, and can include just one of the two. An auxiliary user input device need not include processor 611, memory 613, or bus 615. For example, resistive touch screen 103 may communicate resistive touch screen output data directly to a wired or wireless communications interface 617 or 619 for transmission to smartphone 181 (i.e., without pre-processing in case 101).

In some embodiments, case 101 can be omitted and the auxiliary user input device can instead be secured to the mobile electronic device by a clip, strap, clamp, or other type of securing element. For example, resistive touch screen 103 can have a transparent adhesive backing which facilitates releasably securing the resistive touch screen to a capacitive touch screen (e.g., capacitive touch screen 183) in the mobile electronic device (e.g., smartphone 181). In such embodiments, a wired communications interface can optionally be omitted. A wireless communications interface 619 can be implemented as a Bluetooth interface attached to or embedded in resistive touch screen 103. Such a communication interface can be configured to communicate resistive touch screen output data from resistive touch screen 103 directly to wireless communications interface 659 in smartphone 181.

Figure 5:
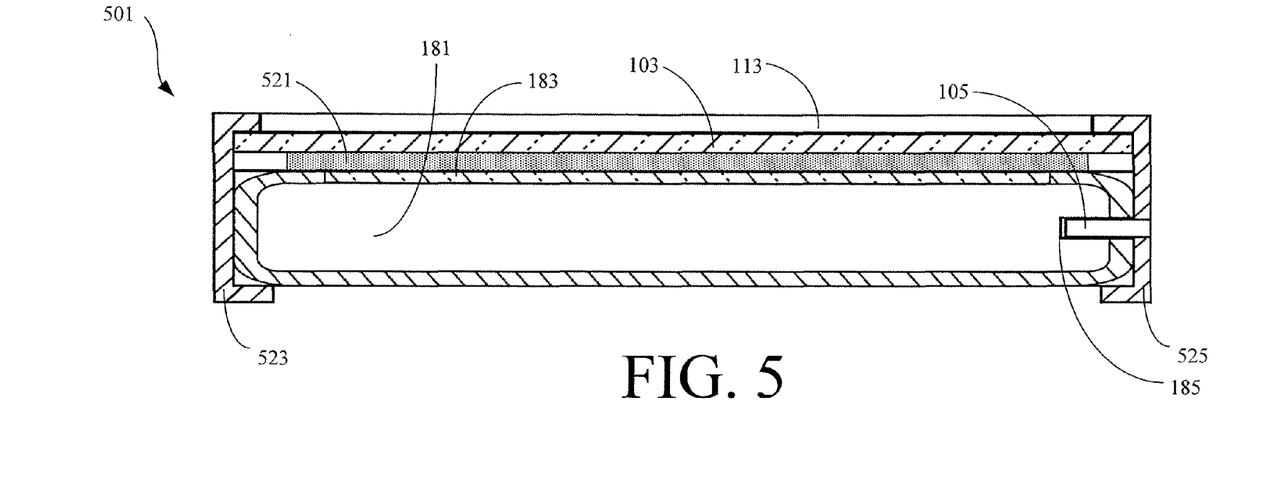
FIG. 5 is a cross-section view of an exemplary alternative embodiment of the auxiliary user input device of FIG. 4.

Referring now to FIG. 5, there is provided a cross-section view of an embodiment of an auxiliary user input device 501, shown with smartphone 181 disposed therein. In this embodiment, the auxiliary user input device comprises a wired communications interface 617 instead of wireless communications interface 619, and a wired connector such as dock connector 105. A transparent adhesive layer 521 (shown with exaggerated thickness) and/or clips 523 and 525 are provided as securing elements which facilitate releasably securing the resistive touch screen 103 to capacitive touch screen 183. Wires connecting dock connector 105 to resistive touch screen 103 can pass through an interior of clip 525.

Various modifications to the exemplary embodiment shown in FIGS. 1-7 will be apparent to those of ordinary skill in the art, and many exemplary modifications have already been discussed above.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A method comprising:
releasably securing a first device comprising a resistive touch screen to a second device comprising a capacitive touch screen, in a position wherein a primary plane of said capacitive touch screen is substantially aligned in parallel and subjacent to a primary plane of said resistive touch screen;
establishing a communication link between a first communications interface in said first device and a second communications interface in said second device;
generating, in said first device, resistive touch screen output data in response to user input received at said resistive touch screen;
communicating said resistive touch screen output data from said first device to said second device via said communication link;
selectively choosing for control of said second device one or more of a plurality of inputs from the group consisting of said resistive touch screen output data and capacitive touch screen output data generated by said capacitive touch screen;
wherein said choosing step is based on an output signal from at least one sensor selected from the group consisting of a humidity sensor and a battery life sensor.

2. The method according to claim 1, wherein said releasably securing step further comprises inserting said second device in a case which includes said resistive touch screen.

3. The method according to claim 1, further comprising:
receiving, in a processor of said second device, said resistive touch screen output data;
concurrently receiving said user input at said capacitive touch screen; and
generating in said second device capacitive touch screen output data in response to said user input.

4. The method according to claim 3, further comprising concurrently utilizing said resistive touch screen output data and said capacitive touch screen output data for determining a user input.

5. The method according to claim 1, wherein said choosing step is further based on an evaluation of a quality of at least one of said capacitive touch screen output data and said resistive touch screen output data.

6. An auxiliary user input device, comprising:
a resistive touch screen configured to generate resistive touch screen output data in response to user input received at said resistive touch screen;
a securing element configured to releasably secure said auxiliary input device to a mobile electronic device in a position which orients a primary plane of a capacitive touch screen associated with said mobile electronic device substantially parallel and subjacent to a primary plane of said resistive touch screen;
a first communication interface configured to communicate said resistive touch screen output data from said auxiliary user input device to a second communication interface associated with said mobile electronic device; and
at least one sensor element providing sensor output data to facilitate determining when user inputs from the resistive touch screen should be used in place of user inputs from the capacitive touch screen, the at least one sensor element configured to communicate the sensor output data to said mobile electronic device through said first communication interface, wherein the at least one sensor element is comprised of at least one of a humidity sensor and a battery life sensor.

7. The auxiliary user input device according to claim 6, wherein said securing element is comprised of a case configured to enclose said mobile electronic device.

8. The auxiliary user input device according to claim 7, wherein said case includes an integrated connector element configured to facilitate an electrical connection between said first communication interface and said second communication interface.

9. The auxiliary user input device according to claim 8, wherein said case and a position of said integrated connector element within said case are configured to align said integrated connector element with a position of a corresponding connector element of said mobile electronic device when said mobile electronic device is inserted in said case.

10. A system comprising a mobile electronic device and an auxiliary user input device, the system comprising:
a resistive touch screen in said auxiliary user input device configured to generate resistive touch screen output data in response to user input received at said resistive touch screen;
a first communications interface in said auxiliary user input device configured to receive said resistive touch screen output data;
a second communications interface in said mobile electronic device configured to receive said resistive touch screen output data via said first communications interface;
a capacitive touch screen in said mobile electronic device;
a securing element configured to releasably secure said auxiliary user input device to said mobile electronic device in a position which orients a primary plane of said capacitive touch screen substantially parallel and subjacent to a primary plane of said resistive touch screen;
a control processor which utilizes said resistive touch screen output data for determining a user input when said mobile electronic device is in a resistive input mode, utilizes said capacitive touch screen output data for determining a user input when said mobile electronic device is in a capacitive input mode, and utilizes said resistive touch screen output data and said capacitive touch screen output data for determining a user input when said mobile electronic device is in a blended input mode; and
at least one sensor selected from the group consisting of a humidity sensor and a battery life sensor disposed in one of said auxiliary user input device and said mobile electronic device and configured to generate sensor output data;
wherein said control processor receives said sensor output data and selects one of said resistive, capacitive and blended input modes based on said sensor output data.

11. The system according to claim 10, wherein said securing element is comprised of a case configured to enclose said mobile electronic device.

12. The system according to claim 10, wherein said control processor is further configured to:
analyze at least one of said capacitive touch screen output data and said resistive touch screen output data to compute at least one measure of data quality; and
select one of said resistive, capacitive and blended input mode based on said at least one measure of data quality.

13. The system according to claim 10, wherein said control processor is further configured to increase a sensitivity associated with said capacitive touch screen when said auxiliary user input device is releasably secured to said mobile electronic device.

14. The method according to claim 1, further comprising increasing a sensitivity level of a capacitive touch screen device driver in response to a detected communications link between the first and second devices.

15. The method according to claim 1, further comprising computing a weighted average of said resistive touch screen output data and said capacitive touch screen output data to generate an input for controlling said second device.

16. The method according to claim 1, wherein the choosing step is further based on a weighted function of at least two criteria selected from the group comprising a capacitive data quality, a resistive data quality, humidity sensor data, battery life sensor data, and mechanical switch position data.

17. The method according to claim 1, wherein the resistive touch screen data is chosen when a measured humidity is above a first threshold value, and both the resistive touch screen data and the capacitive touch screen data are chosen when a measured humidity is above a second threshold value different than the first threshold value.

18. The method according to claim 1, wherein the choosing step is based on a battery life of a battery contained in the first device and a batter life of a battery contained in the second device.

* * * * *